United States Patent [19]

Meininger et al.

[11] 4,045,428
[45] Aug. 30, 1977

[54] WATER-SOLUBLE REACTIVE NAPHTHYLAZONAPHTHYL DYESTUFFS

[75] Inventors: Fritz Meininger, Frankfurt am Main; Klaus Hunger, Kelkheim, Taunus; Hartmut Springer, Frankfurt am Main, all of Germany

[73] Assignee: Hoechst Aktiengesellschaft, Frankfurt am Main, Germany

[21] Appl. No.: 603,914

[22] Filed: Aug. 12, 1975

Related U.S. Application Data

[63] Continuation-in-part of Ser. No. 283,564, Aug. 24, 1972, abandoned.

[30] Foreign Application Priority Data

Aug. 26, 1971 Germany .................. 2142728

[51] Int. Cl.² .............. C09B 62/50; C09B 62/74; D06P 1/06; D06P 1/38
[52] U.S. Cl. .................. 260/198; 260/162; 260/193; 260/194; 260/195; 260/196; 260/199; 260/200; 260/575
[58] Field of Search ............. 260/193, 194, 196, 195, 260/197, 198, 199, 200, 201

[56] References Cited

U.S. PATENT DOCUMENTS

| 3,202,652 | 8/1965 | Meininger et al. | 260/200 |
| 3,461,111 | 8/1969 | Hoyer et al. | 260/147 |
| 3,471,469 | 10/1969 | Meininger et al. | 260/163 |
| 3,655,642 | 4/1972 | Meininger et al. | 260/194 |

FOREIGN PATENT DOCUMENTS

45-10789   4/1970   Japan ............ 260/162

*Primary Examiner*—Floyd D. Higel
*Attorney, Agent, or Firm*—Curtis, Morris & Safford

[57] ABSTRACT

A water-soluble monoazo-dyestuff of the formula (1)

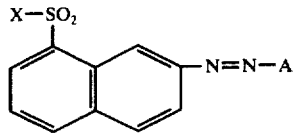

(1)

in which X represents —CH=CH₂ or —CH₂—CH₂—Z, the radical Z stands for hydroxyl, sulfato, chlorine, bromine, lower alkyl-sulfonyloxy, lower alkyl-sulfonylamino, phenyl-sulfonyloxy, lower alkyl-phenyl-sulfonyloxy, phenyl-sulfonylamino, lower alkyloyloxy, monosulfobenzoyloxy, phenoxy, di-(lower alkyl)-amino, tri-(lower alkyl)-ammonium, thiosulfato or phosphato, and A is a radical of a coupling component of the aminobenzene, hydroxybenzene amino-naphthalene, hydroxynaphthalene, N-naphthyl- or N-phenyl-amino-pyrazole, N-naphthyl- or N-phenyl-pyrazolone or of the acetoacetanilide series, the coupling component containing at least one water-solubilizing group, and a process for preparing these dyestuffs which are very suitable for the dyeing and printing of native and synthetic carbonamide-groups containing and native, regenerated or synthetic hydroxy-groups containing material, and yield, especially on cellulose fibrous materials in the presence of alkaline agents dyeings and prints of good to very good fastnesses to light and to wet-processing and of good stability to alkalis. The novel dyestuffs also have a very good color-build-up and yield dyeings and prints of high tinctorial strength.

4 Claims, No Drawings

WATER-SOLUBLE REACTIVE NAPHTHYLAZONAPHTHYL DYESTUFFS

This is a continuation-in-part application of application Ser. No. 283,564 filed Aug. 24, 1972, now abandoned.

The present invention relates to novel water-soluble monoazo dyestuffs of the general formula (1)

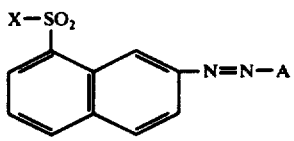

(1)

wherein X is the group —CH=CH$_2$ or —CH$_2$—CH$_2$—Z, Z being a hydroxyl group or an inorganic or organic radical capable of being split off by alkaline reacting agents, and A is the radical of a coupling component of the benzene, naphthalene, acetoacetic acid arylamide or pyrazole series, which contains at least one water-solubilizing group, for example, a sulfo or carboxyl group.

This invention also relates to a process for the preparation of the dyestuffs of this invention.

Suitable inorganic or organic radicals Z capable of being split off by alkaline reacting agents are, for example, the following:

a halogen atom, preferably chlorine or bromine, a low alkylsulfonyloxy or alkylsulfonylamino group, an arylsulfonyloxy group, for example, the p-toluenesulfonyloxy group, an arylsulfonylamino group, a low acyloxy group, for example, the acetoxy or benzoyloxy group, a phenoxy group, a dialkylamino group, preferably a dimethyl or diethylamino group, a trialkylammonium group, especially the thiosulfato group —SSO$_3$H, the phosphate group —OPO$_3$H$_2$ and, most especially, the sulfato group —OSO$_3$H.

The novel monoazo dyestuffs of the above general formula (1) may be prepared by diazotizing β-naphthylamine of the general formula (2)

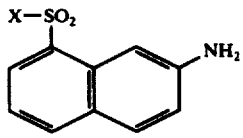

(2)

wherein X is defined as above, according to known methods, for example, with sodium nitrite and mineral acid, coupling it with coupling components of the general formula (3)

H — A    (3)

wherein A is defined as above, in an aqueous medium and by converting, if desired, the dyestuffs of formula (1) so obtained in which X is the group —CH$_2$—CH$_2$—OH, subsequently into dyestuffs of formula (1) in which X is the group —CH$_2$—CH$_2$—Z or —CH=CH$_2$, in which Z is defined as above, except of hydroxyl, according to known methods.

Suitable coupling components of the formula (3) are compounds of the series of the hydroxybenzene, hydroxynaphthalene, aminobenzene, aminonaphthalene, 5-pyrazolone, 5-aminopyrazole or acetoacetic acid aryl amide which contain at least one water-solubilizing group, for example, a sulfo group or a carboxyl group. Taken from the great number of those coupling components, there may be mentioned, for example especially:

1-hydroxynaphthalene-3,-, -4- or -5-sulfonic acid;
1-hydroxynaphthalene-3,6-,-3,7- or -3,8-disulfonic acid;
1-hydroxynaphthalene-4,6-, -4,7- or 4,8-disulfonic acid;
2-hydroxynaphthalene-5-, -6-, -7- or -8-sulfonic acid;
2-hydroxynaphthalene-3,6-, -5,7- or -6,8-disulfonic acid;
1,8-dihydroxynaphthalene-3,6-disulfonic acid;
1-acetylamino-8-hydroxynaphthalene-3,6-disulfonic acid;
1-benzoylamino-8-hydroxynaphthalene-3,6-disulfonic acid;
1-acryloylamino-8-hydroxynaphthalene-4,6-disulfonic acid;
1-acetylamino-8-hydroxynaphthalene-4,6-disulfonic acid;
1-benzoylamino-8-hydroxynaphthalene-4,6-disulfonic acid;
2-acetylamino-5-hydroxynaphthalene-7-sulfonic acid;
2-acetylamino-5-hydroxynaphthalene-1,7-disulfonic acid;
2-acetylamino-8-hydroxynaphthalene-6-sulfonic acid;
2-acetylamino-8-hydroxynaphthalene-3,6-disulfonic acid;
1-benzoylamino-8-hydroxynaphthalene-4-sulfonic acid;
1-acetylamino-5-hydroxynaphthalene-7-sulfonic acid;
2-(3'-sulfophenylamino)-8-hydroxynaphthalene-6-sulfonic acid;
2-amino-8-hydroxynaphthalene-6-sulfonic acid;
2-amino-8-hydroxynaphthalene-3,6-disulfonic acid;
1-amino-8-hydroxynaphthalene-2,4-disulfonic acid;
2-aminonaphthalene-3,6- or -5,7-disulfonic acid;
1,3-diaminobenzene-4-sulfonic acid;
1,3-dihydroxybenzene-4-sulfonic acid;
1-(4'-sulfophenyl)-3-methyl-5-pyrazolone;
1-(3'-sulfophenyl)-3-methyl-5-pyrazolone;
1-(2',5'-disulfophenyl)-3-methyl-5-pyrazolone;
1-(2'-methyl-4'-sulfophenyl)-3-methyl-5-pyrazolone;
1-(2'-chloro-4'-sulfophenyl)-3-methyl-5-pyrazolone;
1-(2'-chloro-5'-sulfophenyl)-3-methyl-5-pyrazolone;
1-(2',5'-dichloro-4'-sulfophenyl)-3-methyl-5-pyrazolone;
1-(6'-sulfonaphthyl-2')-3-methyl-5-pyrazolone;
1-(4',8'-disulfonaphthyl-2')-3-methyl-5-pyrazolone;
1-(2'-methyl-6'-chloro-4'-sulfophenyl)-3-methyl-5-pyrazolone;
1-(3'-sulfophenyl)-3-methyl-5-amino-pyrazole;
1-(4'-sulfophenyl)-3-methyl-5-amino-pyrazole;
1-(2'-chloro-4'-sulfophenyl)-3-methyl-5-amino-pyrazole;
1-(2',5'-dichloro-4'-sulfophenyl)-3-methyl-5-amino-pyrazole;
1-(4'-sulfophenyl)-3-carboxy-5-pyrazolone;
1-(4'-sulfophenyl)-3-carbethoxy-5-pyrazolone;
1-acetoacetylamino-3-methyl-6-methoxybenzene-4-sulfonic acid.

The conversion of dyestuffs of the general formula (1) in which X is the group —CH$_2$—CH$_2$—OH into dyestuffs of the formula (1) in which X is the group —CH—CH$_2$—OSO$_3$H is effected in known manner with sulfatizing agents, for example, with concentrated sulfuric acid, chlorosulfonic acid, amidosulfonic acid or with agents yielding SO₃.

The conversion of dyestuffs of the general formula (1) in which X is the group —CH₂—CH₂—OH into dyestuffs of the formula (1), in which X is the group —CH₂—CH₂—OPO₃H₂ is effected, in known manner, with phosphorylating agents, for example, with concentrated phosphoric acid, pyrophosphoric acid, metaphosphoric acid, polyphosphoric acid, polyphosphoric acid alkyl esters, phosphorusoxychloride or mixtures of phosphoric acid and phosphorus (V)-oxide.

Dyestuffs of the general formula (1) in which Z is an alkyl- or arylsulfonyloxy group or an acyloxy group can be obtained from dyestuffs of the formula (1) in which Z is a hydroxyl group, for example by reacting them in known manner with alkyl- or arylsulfonic acid chlorides, for example methanesulfonic acid chloride or p-toluenesulfonic acid chloride or with carboxylic acid chlorides, for example, acetyl chloride or 3-sulfobenzoyl chloride.

Dyestuffs of the general formula (1) in which X is the group —CH=CH₂ can be obtained in known manner from dyestuffs of the formula (1) in which X is the group —CH₂—CH₂—Z by treating them with alkalis, for example with sodium carbonate or sodium hydroxide.

Dyestuffs of the general formula (1) in which Z is a thiosulfato group —SSO₃H of a dialkylamino group can be obtained in known manner from dyestuffs of the formula (1) in which X is the group —CH=CH₂ by reacting them with salts of the thiosulfuric acid, for example sodium thiosulfate, or by reacting them with dialkylamines, for example, diethylamine.

2-Amino-8-(β-hydroxyethylsulfonyl)-naphthalene of the formula (4)

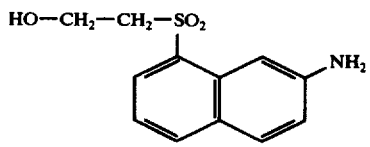

(4)

which can be used as diazocomponent for the preparation of novel monoazo-dyestuffs of the general formula (1) is prepared, for example, by converting 2-acetaminonaphthalene-8-sulfinic acid with ethylene oxide or with 2-chloroethanol into 2-acetamino-8-(β-hydroxyethylsulfonyl)-naphthalene and by deacetylizing it thereafter.

Naphthyl amines of the formula (2) in which X is either the group —CH₂—CH₂—Z, and Z is in this group an inorganic or organic radical capable of being split off by alkaline reacting agents, or the group —CH=CH₂ which amines can also serve as starting substances for the preparation of the novel monoazo dyestuffs, can be obtained according to known operating methods from 2-amino-8-(β-hydroxyethylsulfonyl)-naphthalene of the formula (4). These processes are analogous to the processes described above for the conversion of dyestuffs of formula (1) in which X is the group —CH₂—CH₂—OH into dyestuffs of the formula (1) in which X is the group —CH=CH₂ or the group —CH₂—CH₂—Z, in which group Z is an inorganic or organic radical capable of being split off by alkaline reacting agents.

The monoazo dyestuffs obtainable according to the processes described above are isolated by salting out, for example with sodium or potassium chloride or by spray-drying of the reaction mixture.

The monoazo dyestuffs obtainable according to the processes described in this invention are very suitable for the dyeing and printing of various materials, for example, wool, silk, leather and synthetic polyamide fibrous materials, especially, however, of native or regenerated cellulose fibrous materials, for example, cotton, spun rayon and linen. They can advantageously be used in the dyeing and printing processes generally used in industry for reactive dyestuffs and yield, for example, on cellulose fibrous materials in the presence of agents having an alkaline effect intense dyeings and prints of good to very good fastnesses to light in the dry and wet state, to wet processings such as to alkali, to acid, to water, to washing in the range of from 30° to 100° C, such as at 60° or 95° C, also to washing in the presence of sodium perborate or sodium hypochlorite, to bleaching such as by hypochlorite or peroxide, to alkaline and acid perspiration, to acid and alkaline fulling and to cross-dyeing, to chlorinated water and to mercerizing, furthermore good fastnesses to steaming, ironing, rubbing, to the action of solvents and to copper.

Also there must be mentioned especially their good stability in dyeing and padding liquors, the high tinctorial strength and fixation quote and the very good build-up capacity of the new dyestuffs when used as dyeing and printing dyestuffs for cotton.

The monoazo dyestuffs described in literature which are comparable to the novel dyestuffs with regard to their structure, especially those described in German Patent Specifications Nos. 965,902 and 960,534, in Belgian Patent Specifications Nos. 697,952 and 738,101 and in German Offenlegungsschrift Nos. 1,793,275, 1,794,064, 1,808,587, 1,943,904 and 1,795,086 are surpassed by the monoazo dyestuffs of the invention above all in the tinctorial strength, in the colour build-up according to dyeing and printing processes, in the fastness to light and to wet-processing.

The following Examples illustrate the invention, the parts and percentages are by weight unless stated otherwise.

EXAMPLE 1

33.1 Parts of 2-amino-8-(β-sulfatoethylsulfonyl)-naphthalene (prepared by esterification of 2-amino-8-(β-hydroxyethylsulfonyl)-naphthalene having a melting point of 110° C with concentrated sulfuric acid) were dissolved in 250 parts of water while adding about 9 parts of sodium hydrogen carbonate until the mixture became neutral. Then, 20 parts by volume of 5N sodium nitrite solution were added and this solution was introduced in a mixture of 100 parts of ice and 35 parts of a 37% hydrochloric acid while stirring, so that the temperature did not exceed 5° C. After having destroyed the small excess of nitrous acid with amidosulfonic acid, 55.7 parts of 54.6% 1-hydroxynaphthalene-3,6-disulfonic acid were introduced in the diazo solution so obtained. By slowly adding a 2N sodium carbonate solution the pH was adjusted at 4 and maintained. After the coupling had been completed, the dyestuff so formed was salted out with sodium chloride, filtered off and dried. 125 parts of a salt-containing dyestuff were obtained. The dyestuff had in the form of the free acid the formula:

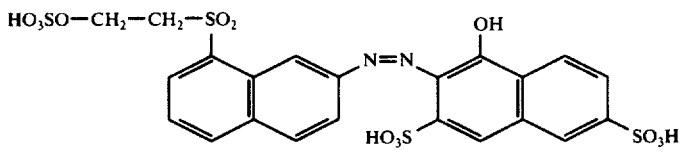

The dyestuff dyes cotton in the presence of agents having an alkaline effect with intense, yellowish red shades, having good fastness to light and to wet processing and is also especially suitable as printing dyestuff since it shows no tendency to staining.

When using in the above Example 1 instead of 1-hydroxynaphthalene-3,6-disulfonic acid equivalent amounts of a coupling component indicated in Table 1, dyestuffs were obtained which have similar dyeing properties and yield shades on cotton as indicated in this Table.

Table 1

| Coupling component | Shade |
|---|---|
| 1-hydroxynaphthalene-3-sulfonic acid | orange |
| 1-hydroxynaphthalene-4-sulfonic acid | yellowish red |
| 1-hydroxynaphthalene-5-sulfonic acid | red |
| 1-hydroxynaphthalene-3,8-disulfonic acid | yellowish red |
| 1-hydroxynaphthalene-4,7-disulfonic acid | red |
| 1-hydroxynaphthalene-4,8-disulfonic acid | bluish red |
| 1-hydroxynaphthalene-3,6,8-trisulfonic acid | yellowish red |
| 2-hydroxynaphthalene-5-sulfonic acid | red |
| 2-hydroxynaphthalene-6-sulfonic acid | yellowish red |
| 2-hydroxynaphthalene-7-sulfonic acid | yellowish red |
| 2-hydroxynaphthalene-8-sulfonic acid | reddish orange |
| 2-hydroxynaphthalene-3,6-disulfonic acid | bluish red |
| 2-hydroxynaphthalene-5,7-disulfonic acid | yellowish red |
| 2-hydroxynaphthalene-6,8-disulfonic acid | orange |
| 1,8-dihydroxynaphthalene-3,6-disulfonic acid | red |
| 1-acetylamino-8-hydroxynaphthalene-3,6-disulfonic acid | bluish red |
| 1-benzoylamino-8-hydroxynaphthalene-3,6-disulfonic acid | bluish red |
| 1-acetylamino-8-hydroxynaphthalene-4,6-disulfonic acid | bluish red |
| 1-benzoylamino-8-hydroxynaphthalene-4,6-disulfonic acid | bluish red |
| 1-acryloylamino-8-hydroxynaphthalene-4,6-desulfonic acid | bluish red |
| 2-acetylamino-5-hydroxynaphthalene-7-sulfonic acid | orange |
| 2-acetylamino-5-hydroxynaphthalene-1,7-disulfonic acid | orange |
| 2-(N-methyl-N-acetylamino)-5-hydroxynaphthalene-7-sulfonic acid | orange |
| 2-acetylamino-8-hydroxynaphthalene-6-sulfonic acid | yellowish red |
| 2-(N-methyl-N-acetylamino)-8-hydroxynaphthalene-6-sulfonic acid | yellowish red |
| 2-acetylamino-8-hydroxynaphthalene-3,6-disulfonic acid | yellowish red |
| 1-benzoylamino-8-hydroxynaphthalene-4-sulfonic acid | bluish red |
| 1-acetylamino-5-hydroxynaphthalene-7-sulfonic acid | yellowish red |
| 2-(3'-sulfophenylamino)-8-hydroxynaphthalene-6-sulfonic acid | yellowish red |
| 2-amino-8-hydroxynaphthalene-6-sulfonic acid | bluish red |
| 2-amino-8-hydroxynaphthalene-3,6-disulfonic acid | bluish red |
| 1-amino-8-hydroxynaphthalene-2,4-disulfonic acid | red violet |
| 1-aminonaphthalene-4-sulfonic acid | red |
| 2-aminonaphthalene-6-sulfonic acid | orange |
| 2-aminonaphthalene-3,6-disulfonic acid | orange |
| 2-aminonaphthalene-5,7-disulfonic acid | orange |
| 1-(4'-sulfophenyl)-3-methyl-5-pyrazolone | yellow |

Table 1-continued

| Coupling component | Shade |
|---|---|
| 1-(3'-sulfophenyl)-3-methyl-5-pyrazolone | yellow |
| 1-(2',5'-disulfophenyl)-3-methyl-5-pyrazolone | yellow |
| 1-(2'-methyl-4'-sulfophenyl)-3-methyl-5-pyrazolone | yellow |
| 1-(2'-chloro-4'-sulfophenyl)-3-methyl-5-pyrazolone | yellow |
| 1-(2'-chloro-5'-sulfophenyl)-3-methyl-5-pyrazolone | yellow |
| 1-(2',5'-dichloro-4'-sulfophenyl)-3-methyl-5-pyrazolone | yellow |
| 1-(6'-sulfonaphthyl-2')-3-methyl-5-pyrazolone | yellow |
| 1-(4',8'-disulfonaphthyl-2')-3-methyl-5-pyrazolone | yellow |
| 1-(2'-methyl-6'-chloro-4'-sulfophenyl)-3-methyl-5-pyrazolone | yellow |
| 1-(3'-sulfophenyl)-3-methyl-5-amino-pyrazole | yellow |
| 1-(4'-sulfophenyl)-3-methyl-5-amino-pyrazole | yellow |
| 1-(2'-chloro-4'-sulfophenyl)-3-methyl-5-amino-pyrazole | yellow |
| 1-(2',5'-dichloro-4'-sulfophenyl)-3-methyl-5-amino-pyrazole | yellow |
| 1-(4'-sulfophenyl)-3-carboxy-5-pyrazolone | reddish yellow |
| 1-phenyl-3-carboxy-5-pyrazolone | reddish yellow |
| 1-(4'-sulfophenyl)-3-carbethoxy-5-pyrazolone | reddish yellow |
| 1-acetoacetylaminobenzene-4-sulfonic acid | greenish yellow |
| 1-acetoacetylamino-3-methyl-6-methoxybenzene-4-sulfonic acid | greenish yellow |
| 1-[4'-(β-sulfatoethylsulfonyl)-phenyl]-3-methyl-5-pyrazolone | yellow |
| 1-[4'-(β-sulfatoethylsulfonyl)-phenyl]-3-carboxy 5-pyrazolone | reddish yellow |

EXAMPLE 2

25.1 Parts of 2-amino-8-(β-hydroxyethylsulfonyl)-naphthalene were dissolved in 250 parts of water and 30 parts of 37% hydrochloric acid. The solution was cooled and diazotized below +5° C by adding 20 parts by volume of 5N sodium nitrite solution. 55.7 Parts of 54.6% 1-hydroxynaphthalene-3,6-disulfonic acid were introduced into the diazo solution so obtained and then, the pH was adjusted at 2 by adding sodium carbonate, and maintained. After the coupling had been completed the dyestuff formed was salted out with sodium chloride, filtered off and dried. 110 Parts of a salt-containing dyestuff were obtained. The dyestuff had in the form of the free acid the following formula:

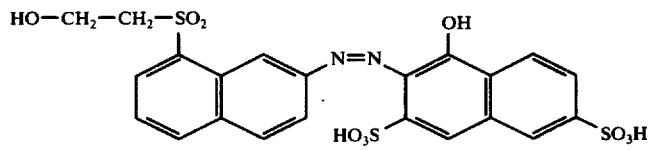

The dyestuff yielded on cotton in the presence of agents having an alkaline effect and after thermofixation of yellowish red printing design being fast to light and washing.

Dyestuffs of similar properties were obtained when using in the above Example 2 instead of 1-hydroxynaphthalene-3,6-disulfonic acid equivalent amounts of the coupling components indicated in Table 1.

EXAMPLE 3

56 Parts of the salt-containing dyestuff which had been prepared in Example 2, were introduced into 200 parts of concentrated sulfuric acid, stirred and completely dissolved. The solution so obtained was introduced into a mixture of 450 parts of ice and 50 parts of water while stirring and the ester dyestuff formed was salted out with sodium chloride. The dyestuff was filtered off, dissolved in 200 parts of water while adding sodium hydrogen carbonate until pH 5.5 was reached, and then the solution so obtained was evaporated to dryness. The dyestuff could well be dissolved in water and was suitable as printing and dyeing dyestuff. Intense, yellowish red dyeings of good to very good fastness to wet processing and to light were obtained on native or regenerated cellulose fibers, for example, from cold or hot dyeing liquors containing salt and using alkalis.

The dyestuff had in the form of the free acid the formula

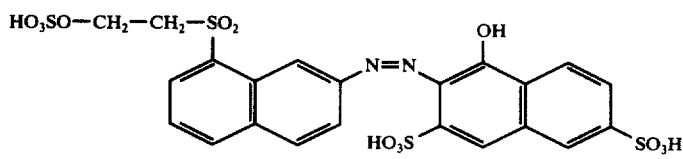

EXAMPLE 4

64.6 Parts of the dyestuff prepared in the manner indicated in Example 3 were dissolved in 500 parts of water. At 20° to 25° C 8 parts of diethyl amine were added, and then, slowly, about 30 parts of 33% sodium hydroxide solution until the pH was up to 12.0 to 12.5. The mixture was stirred at 20° to 25° C for 16 hours. Then, the pH of the reaction mixture was adjusted at 7.8 to 8.3 by adding about 35 parts of a 20% hydrochloric acid, the dyestuff was entirely precipitated by salting out with sodium chloride, filtered off, washed with a sodium chloride solution and dried.

The dyestuff so prepared had the formula

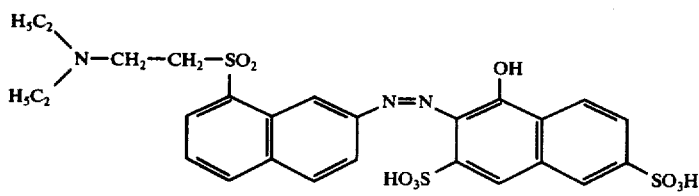

It could be dissolved in water yielding a red colour and was very suitable for the printing of cotton fabric on which it yielded in the presence of agents having an alkaline effect intense yellowish red prints of good fastness properties. The stability of alkaline printing pastes containing this dyestuff was very good.

EXAMPLE 5

32.3 Parts of the dyestuff as prepared in Example 3 were dissolved in 350 parts of water. About 30 parts of 33% sodium hydroxide solution were slowly added to that solution at from 25° to 30° C until the pH reached 12.0 to 12.5, and was maintained. The solution was stirred for a short while, hydrochloric acid was added until it became neutral and the dyestuff was isolated by salting out with sodium chloride.

The dyestuff so obtained had in the form of the free acid the formula

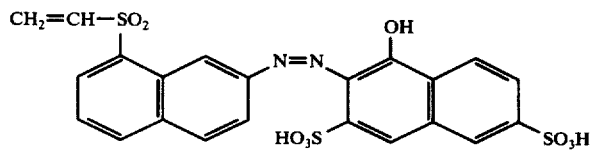

It was particularly suitable for printing and dyeing cotton fabric on which it yielded in the presence of agents having an alkaline effect red dyeings and prints of very good fastness to washing and good fastness to light.

EXAMPLE 6

27.8 Parts of the vinylsulfonyl dyestuff prepared as described in Example 5 were introduced in 300 parts of water. The solution was heated to 70° to 75° C and at that temperature, 23.5 parts of sodium thiosulfate containing crystal water were added. The pH was adjusted at 5.7 to 6.2 by adding 50% acetic acid and maintained at that level for 3 hours by adding acid.

After the reaction had been completed, the dyestuff was precipitated by adding sodium chloride, filtered off and dried. 48 Parts of a salt-containing dyestuff of the formula

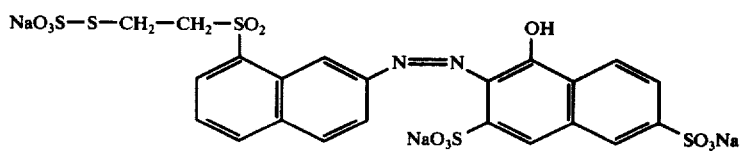

were obtained. The dyestuff could easily be dissolved in water yielding a red colour and could be used for the dyeing and printing of cellulose textile materials in the presence of agents having an alkaline effect.

The yellowish red dyeings and prints so obtained were fast to washing and to light.

EXAMPLE 7

33.1 Parts of 2-amino-8-(β-phosphatoethylsulfonyl)-naphthalene (prepared by treating 2-amino-8-(β-hydroxyethylsulfonyl)-naphthalene having a melting point of 110° C with polyphosphoric acid) were dissolved in 250 parts of water by adding sodium hydrogen carbonate until the solution became neutral. 20 Parts by volume of 5N sodium nitrite solution were added and this solution was introduced into a mixture of 100 parts of ice and 35 parts of a 37% hydrochloric acid while stirring in such a manner that the temperature did not exceed 5° C.

Into the diazo solution so obtained, 64.2 parts of 1-benzoyl-amino-8-hydroxynaphthalene-4,6-disulfonic acid (having a strength of 66%) were introduced and the pH was adjusted to 6 by adding dropwise about 50 parts of saturated sodium carbonate solution. After the coupling had been completed, the dyestuff solution obtained was evaporated to dryness.

The dyestuff so prepared had in the form of the free acid the formula the methylsulfonic acid ester of 2-amino-8-(β-hydroxyethylsulfonyl)-naphthalene; the p-toluenesulfonic acid ester of 2-amino-8-(β-hydroxyethylsulfonyl)-naphthalene;

dyestuffs were obtained which have similar dyeing properties and yielded bluish red dyeings of the same good fastnesses.

We claim:

1. The watersoluble monoazodyestuff of the formula

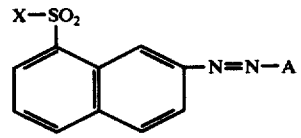

in which X is —CH=CH₂ or —CH₂—CH₂—Z, Z is hydroxy, sulfato, chlorine, bromine, lower alkyl-sulfonyloxy, lower alkyl-sulfonylamino, phenyl-sulfonyloxy, lower alkyl-phenyl-sulfonyloxy, phenyl-sulfonylamino, lower alkyloyloxy, monosulfobenzoyloxy, phenoxy, di-(lower alkyl)-amino, tri-(lower alkyl)-ammonium, thiosulfato or phosphato, and A is monosulfo-hydroxynaphthylene, disulfo-hydroxy-naphthylene, trisulfo-hydroxynaphthylene, disulfo-dihydroxy-

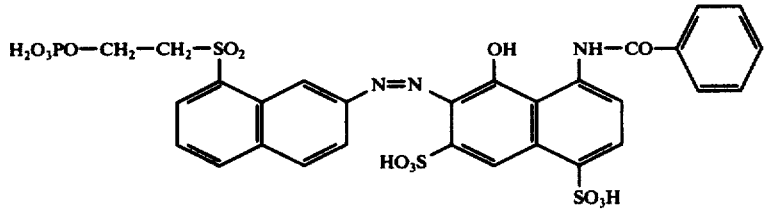

It yielded a bluish red color when being dissolved in water and dyed cotton in the presence of agents having an alkaline effect with an intense, bluish red shade, the dyeing having a good fastness to light and stability towards treatments with water.

When using in the Example 7 given above instead of 2-amino-8-(β-phosphatoethylsulfonyl)-naphthalene equivalent amounts of the following amine:

2-amino-8-(β-chloroethylsulfonyl)-naphthalene;
2-amino-8-(β-acetoxyethylsulfonyl)-naphthalene;
2-amino-8-(β-bromoethylsulfonyl)-naphthalene;
2-amino-8-(β-phenoxyethylsulfonyl)-naphthalene;

naphthylene, lower alkyloylamino-monosulfo-hydroxynaphthylene, lower alkenyloylamino-monosulfo-hydroxynaphthylene, benzoylamino-monosulfo-hydroxynaphthylene, N-lower alkyl-N-lower alkyloylamino-monosulfo-hydroxynaphthylene, N-lower alkyl-N-lower alkyloylamino-disulfo-hydroxynaphthylene, lower alkyloylamino-disulfo-hydroxynaphthylene, lower alkenyloylamino-disulfo-hydroxynaphthylene, benzoylamino-disulfo-hydroxynaphthylene, monosulfo-phenylamino-monosulfo-hydroxynaphthylene, monosulfo-aminonaphthylene, disulfo-aminonaphthylene, monosulfo-aminohydroxynaphthylene or disulfoamino-hydroxynaphthylene.

2. The dyestuff of the formula

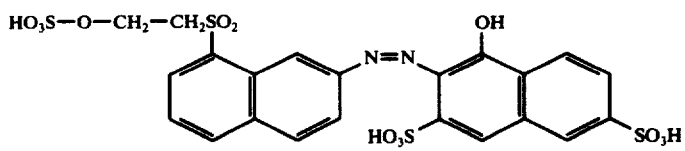

3. The dyestuff of the formula

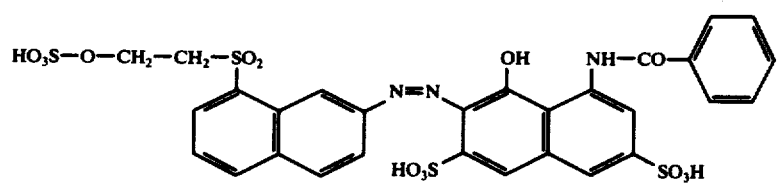
4. The dyestuff of the formula
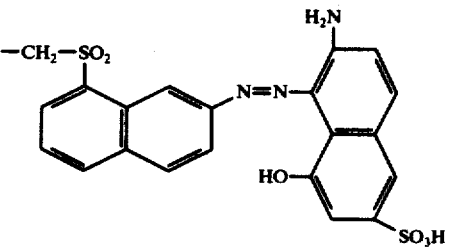
* * * * *